(12) United States Patent
Lin

(10) Patent No.: US 12,531,768 B2
(45) Date of Patent: Jan. 20, 2026

(54) METHOD AND APPARATUS FOR RANDOM ACCESS

(71) Applicant: Telefonaktiebolaget LM Ericsson (publ), Stockholm (SE)

(72) Inventor: Zhipeng Lin, Jiangsu (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 334 days.

(21) Appl. No.: 18/016,810

(22) PCT Filed: Aug. 6, 2021

(86) PCT No.: PCT/CN2021/111266
§ 371 (c)(1),
(2) Date: Jan. 18, 2023

(87) PCT Pub. No.: WO2022/028596
PCT Pub. Date: Feb. 10, 2022

(65) Prior Publication Data
US 2023/0291624 A1    Sep. 14, 2023

(30) Foreign Application Priority Data

Aug. 7, 2020    (WO) ................ PCT/CN2020/107857

(51) Int. Cl.
*H04L 27/26*     (2006.01)
*H04W 74/0833*   (2024.01)
*H04W 76/20*     (2018.01)

(52) U.S. Cl.
CPC ..... *H04L 27/2605* (2013.01); *H04W 74/0841* (2013.01); *H04W 76/20* (2018.02)

(58) Field of Classification Search
None
See application file for complete search history.

(56) References Cited

U.S. PATENT DOCUMENTS

2018/0139082 A1    5/2018   Chen et al.
2019/0149365 A1*   5/2019   Chatterjee ............. H04W 76/11
                                                              370/329
(Continued)

FOREIGN PATENT DOCUMENTS

CN    108886738 A    11/2018
CN    110417521 A    11/2019
(Continued)

OTHER PUBLICATIONS

"3GPP TS 38.211 V16.2.0", 3rd Generation Partnership Project; Technical Specification Group Radio Access Network; NR; Physical channels and modulation (Release 16), Jun. 2020, pp. 1-131.
(Continued)

*Primary Examiner* — Lonnie V Sweet
(74) *Attorney, Agent, or Firm* — Murphy, Bilak & Homiller, PLLC

(57) ABSTRACT

Various embodiments of the present disclosure provide a method for random access. The method which may be performed by a terminal device comprises receiving, from a network node, signaling information indicating whether a first type of cyclic prefix or a second type of cyclic prefix is configured for transmission of an uplink shared channel of a message of the terminal device. The message includes data on the uplink shared channel and a random access preamble. The method further comprises determining time domain resource allocation for the transmission of the uplink shared channel of the message, based at least in part on the signaling information. According to various embodiments of the present disclosure, the cyclic prefix for message A physical uplink shared channel transmission can be determined flexibly, and the corresponding TDRA for message A physical uplink shared channel transmission can be determined adaptively.

18 Claims, 11 Drawing Sheets

(56) References Cited

U.S. PATENT DOCUMENTS

| | | | |
|---|---|---|---|
| 2020/0100297 A1 | 3/2020 | Agiwal et al. | |
| 2020/0146010 A1* | 5/2020 | Abdoli | H04L 5/0044 |
| 2020/0214044 A1 | 7/2020 | Qian et al. | |
| 2020/0252977 A1 | 8/2020 | Zhang et al. | |
| 2021/0112600 A1* | 4/2021 | Lei | H04L 5/0091 |
| 2022/0167425 A1* | 5/2022 | Lei | H04L 5/0028 |
| 2022/0174728 A1* | 6/2022 | Ohara | H04W 74/0836 |
| 2022/0191935 A1* | 6/2022 | Xiong | H04W 74/0836 |
| 2022/0191948 A1* | 6/2022 | Lei | H04W 74/0866 |
| 2022/0225258 A1* | 7/2022 | Ratasuk | H04W 72/20 |

FOREIGN PATENT DOCUMENTS

| | | |
|---|---|---|
| CO | 2018007137 A2 | 7/2018 |
| WO | 2019147072 A1 | 8/2019 |
| WO | 2019217829 A1 | 11/2019 |
| WO | 2020068596 A1 | 4/2020 |
| WO | 2020149660 A1 | 7/2020 |

OTHER PUBLICATIONS

"MsgA transmission for NR-U", 3GPP TSG-RAN WG2 #109 electronic, R2-2000393, Elbonia, Feb. 24-Mar. 6, 2020, pp. 1-4.
"3GPP TS 38.213 V16.2.0", 3rd Generation Partnership Project; Technical Specification Group Radio Access Network; NR; Physical layer procedures for control (Release 16), Jun. 2020, pp. 1-176.
"3GPP TS 38.214 V16.2.0", 3rd Generation Partnership Project; Technical Specification Group Radio Access Network; NR; Physical layer procedures for data (Release 16), Jun. 2020, pp. 1-163.
"Introduction of Two step RACH for NR", 3GPP TSG-RAN Meeting #86, RP-192635, Sitges, Spain, Dec. 9-12, 2019, 1 page.
"Introduction of two-step RACH", 3GPP TSG-RAN WG1, Meeting #99, R1-1913628, Reno, USA, Nov. 18-22, 2019, pp. 1-30.

* cited by examiner

BWP information element

```
-- ASN1START
-- TAG-BWP-START

BWP ::=                      SEQUENCE {
    locationAndBandwidth         INTEGER (0..37949),
    subcarrierSpacing            SubcarrierSpacing,
    cyclicPrefix                 ENUMERATED { extended }
OPTIONAL    -- Need R
}

-- TAG-BWP-STOP
-- ASN1STOP
```

Receive, from a network node, signaling information indicating whether a first type of CP or a second type of CP is configured for transmission of an uplink shared channel of a message of the terminal device — 412

Determine TDRA for the transmission of the uplink shared channel of the message, based at least in part on the signaling information — 414

Fig.4A

METHOD AND APPARATUS FOR RANDOM ACCESS

FIELD OF THE INVENTION

The present disclosure generally relates to communication networks, and more specifically, to a method and apparatus for random access.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE) and new radio (NR) networks are expected to achieve high traffic capacity and end-user data rate with lower latency. In order to connect to a network node such as a base station, a random access (RA) procedure may be initiated for a terminal device such as a user equipment (UE). In the RA procedure, system information (SI) and synchronization signals (SS) as well as the related radio resource and transmission configuration can be informed to the terminal device by signaling messages from the network node. The RA procedure can enable the terminal device to establish a session for a specific service with the network node.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A wireless communication network such as a NR network may be able to support flexible network configurations. Different signaling approaches (e.g., a four-step approach, a two-step approach, etc.) may be used for a RA procedure of a terminal device to set up a connection with a network node. In the RA procedure, the terminal device may perform a RA preamble transmission and a physical uplink shared channel (PUSCH) transmission to the network node in different messages (e.g., in message 1/msg1 and message 3/msg3/Msg3 for four-step RA, respectively) or in the same message (e.g., in message A/msgA/MsgA for two-step RA). The RA preamble may be transmitted in a time-frequency physical random access channel (PRACH) occasion (which is also known as a RA occasion, RACH occasion, or RO for short). The PUSCH transmission may occur in a PUSCH occasion (PO) configured with one or more demodulation reference signal (DMRS) resources. In different RA procedures, e.g. contention-based random access (CBRA) and contention-free random access (CFRA), PUSCH transmissions may be performed according to different configurations. Currently, only a default time domain resource allocation (TDRA) table for a normal cyclic prefix (CP) is used for msgA PUSCH transmission. However, an extended CP may also be applicable for msgA PUSCH transmission. Therefore, it may be desirable to implement determination of CP and TDRA for msgA PUSCH transmission in a more efficient way.

Various embodiments of the present disclosure propose a solution for RA, which can determine a CP and corresponding TDRA for transmission of msgA PUSCH, e.g., by considering whether the normal CP and/or the extended CP can be supported for the transmission of msgA PUSCH, so that the determination of CP and TDRA for the transmission of msgA PUSCH may be implemented adaptively and flexibly.

It can be appreciated that the term "transmission of msgA PUSCH" mentioned in this document may also be referred to as "msgA PUSCH transmission", meaning transmission of msgA data/information/payload on a PUSCH. Similarly, it also can be appreciated that the term "transmission of an uplink shared channel" mentioned in this document may also be referred to as "an uplink shared channel transmission", meaning transmission of data/information/payload on the uplink shared channel.

It can be appreciated that the terms "four-step RA procedure" and "four-step RACH procedure" mentioned herein may also be referred to as Type-1 random access procedure as defined in the 3rd generation partnership project (3GPP) technical specification (TS) 38.213 V16.2.0, where the entire content of this technical specification is incorporated into the present disclosure by reference. These terms may be used interchangeably in this document.

Similarly, it can be appreciated that the terms "two-step RA procedure" and "two-step RACH procedure" mentioned herein may also be referred to as Type-2 random access procedure as defined in 3GPP TS 38.213 V16.2.0, and these terms may be used interchangeably in this document.

In addition, it can be appreciated that a two-step CFRA procedure described in this document may refer to a contention-free random access procedure in which a terminal device is configured to transmit a msgA to a network node as a first step, and a msgB in response to the msgA is expected to be received from the network node by the terminal device as a second step. It can be appreciated that the term "two-step CFRA" mentioned herein may also be referred to as "CFRA with two-step RA type" or "contention-free Type-2 random access", and these terms may be used interchangeably in this document.

Similarly, it can be appreciated that a two-step CBRA procedure described in this document may refer to a contention-based random access procedure in which a terminal device is configured to transmit a msgA to a network node as a first step, and a msgB in response to the msgA is expected to be received from the network node by the terminal device as a second step. It can be appreciated that the term "two-step CBRA" mentioned herein may also be referred to as "CBRA with two-step RA type" or "contention-based Type-2 random access", and these terms may be used interchangeably in this document.

It can be realized that the terms "PRACH occasion", "random access channel (RACH) occasion" or "RA occasion" mentioned herein may refer to a time-frequency resource usable for the preamble transmission in a RA procedure, which may also be referred to as "random access occasion (RO)". These terms may be used interchangeably in this document.

Similarly, it can be realized that the terms "PUSCH occasion", "uplink shared channel occasion" or "shared channel occasion" mentioned herein may refer to a time-frequency resource usable for PUSCH transmission in a RA procedure, which may also be referred to as "physical uplink shared channel occasion (PO)". These terms may be used interchangeably in this document.

According to a first aspect of the present disclosure, there is provided a method performed by a terminal device such as a UE. The method comprises receiving, from a network node, signaling information indicating whether a first type of CP or a second type of CP is configured for transmission of an uplink shared channel of a message (e.g., msgA PUSCH, etc.) of the terminal device. The message may include data on the uplink shared channel (e.g., PUSCH, etc.) and a random access preamble (e.g., PRACH preamble, etc.). In accordance with an exemplary embodiment, the method further comprises determining TDRA (e.g., a TDRA table, etc.) for the transmission of the uplink shared channel of the message, based at least in part on the signaling information.

In accordance with an exemplary embodiment, both the first type of CP and the second type of CP may be supported for the transmission of the uplink shared channel of the message.

In accordance with an exemplary embodiment, the TDRA for the transmission of the uplink shared channel of the message may be default TDRA for the first type of CP, when the signaling information indicates that the first type of CP is configured for an active bandwidth part (BWP) for the transmission of the uplink shared channel of the message.

In accordance with an exemplary embodiment, the TDRA for the transmission of the uplink shared channel of the message may be default TDRA for the second type of CP, when the signaling information indicates that the second type of CP is configured for an active BWP for the transmission of the uplink shared channel of the message.

In accordance with an exemplary embodiment, the TDRA for the transmission of the uplink shared channel of the message may be default TDRA for the first type of CP, when only the first type of CP is supported for the transmission of the uplink shared channel of the message.

In accordance with an exemplary embodiment, the signaling information may be included in a BWP information element (IE).

In accordance with an exemplary embodiment, the TDRA for the transmission of the uplink shared channel of the message may be default TDRA for the first type of CP, when the signaling information indicates that the first type of CP is configured for the transmission of the uplink shared channel of the message.

In accordance with an exemplary embodiment, the TDRA for the transmission of the uplink shared channel of the message may be default TDRA for the second type of CP, when the signaling information indicates that the second type of CP is configured for the transmission of the uplink shared channel of the message.

In accordance with an exemplary embodiment, the signaling information may be included in radio resource control (RRC) signaling.

In accordance with an exemplary embodiment, the terminal device may be in RRC idle or inactive mode, or in a two-step CBRA procedure. Correspondingly, the RRC signaling may be common RRC signaling.

In accordance with an exemplary embodiment, the terminal device may be in RRC connected mode, or in a two-step CFRA procedure. Correspondingly, the RRC signaling may be dedicated RRC signaling.

In accordance with an exemplary embodiment, the first type of CP may be a normal CP and the second type of CP may be an extended CP.

According to a second aspect of the present disclosure, there is provided an apparatus which may be implemented as a terminal device. The apparatus comprises one or more processors and one or more memories comprising computer program codes. The one or more memories and the computer program codes are configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a terminal device. The apparatus comprises a receiving unit and a determining unit. In accordance with some exemplary embodiments, the receiving unit is operable to carry out at least the receiving step of the method according to the first aspect of the present disclosure. The determining unit is operable to carry out at least the determining step of the method according to the first aspect of the present disclosure.

According to a fifth aspect of the present disclosure, there is provided a method performed by a network node such as a base station. The method comprises determining whether to configure a first type of CP or a second type of CP for transmission of an uplink shared channel of a message of a terminal device. The message may include data on the uplink shared channel and a random access preamble. In accordance with an exemplary embodiment, the method further comprises transmitting, to the terminal device, signaling information indicating a result of the determination. The signaling information may be used by the terminal device to determine TDRA for the transmission of the uplink shared channel of the message.

In accordance with some exemplary embodiments, the signaling information transmitted by the network node according to the fifth aspect of the present disclosure may correspond to the signaling information received by the terminal device according to the first aspect of the present disclosure. Thus, the signaling information according to the first and fifth aspects of the present disclosure may have the same or similar contents and/or feature elements. Correspondingly, the determination of TDRA for the transmission of the uplink shared channel of the message according to the first and fifth aspects of the present disclosure may be based on the same or similar parameter(s) and/or criterion(s).

According to a sixth aspect of the present disclosure, there is provided an apparatus which may be implemented as a network node. The apparatus comprises one or more processors and one or more memories comprising computer program codes. The one or more memories and the computer program codes are configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a network node. The apparatus comprises a determining unit and a transmitting unit. In accordance with some exemplary embodiments, the determining unit is operable to carry out at least the determining step of the method according to the fifth aspect of the present disclosure. The transmitting unit is operable to carry out at least the transmitting step of the method according to the fifth aspect of the present disclosure.

According to a ninth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the fifth aspect of the present disclosure.

According to a tenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the fifth aspect of the present disclosure.

According to an eleventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the first aspect of the present disclosure.

According to a twelfth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first aspect of the present disclosure.

According to a thirteenth aspect of the present disclosure, there is provided a method implemented in a communication system which may include a host computer, a base station and a UE. The method may comprise, at the host computer, receiving user data transmitted to the base station from the UE which may perform any step of the method according to the first aspect of the present disclosure.

According to a fourteenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the first aspect of the present disclosure.

According to a fifteenth aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the fifth aspect of the present disclosure.

According to a sixteenth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the fifth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which:

FIG. 3 is a diagram illustrating an exemplary BWP IE according to an embodiment of the present disclosure;

FIG. 4A is a flowchart illustrating a method according to some embodiments of the present disclosure;

DETAILED DESCRIPTION

Figure 1:
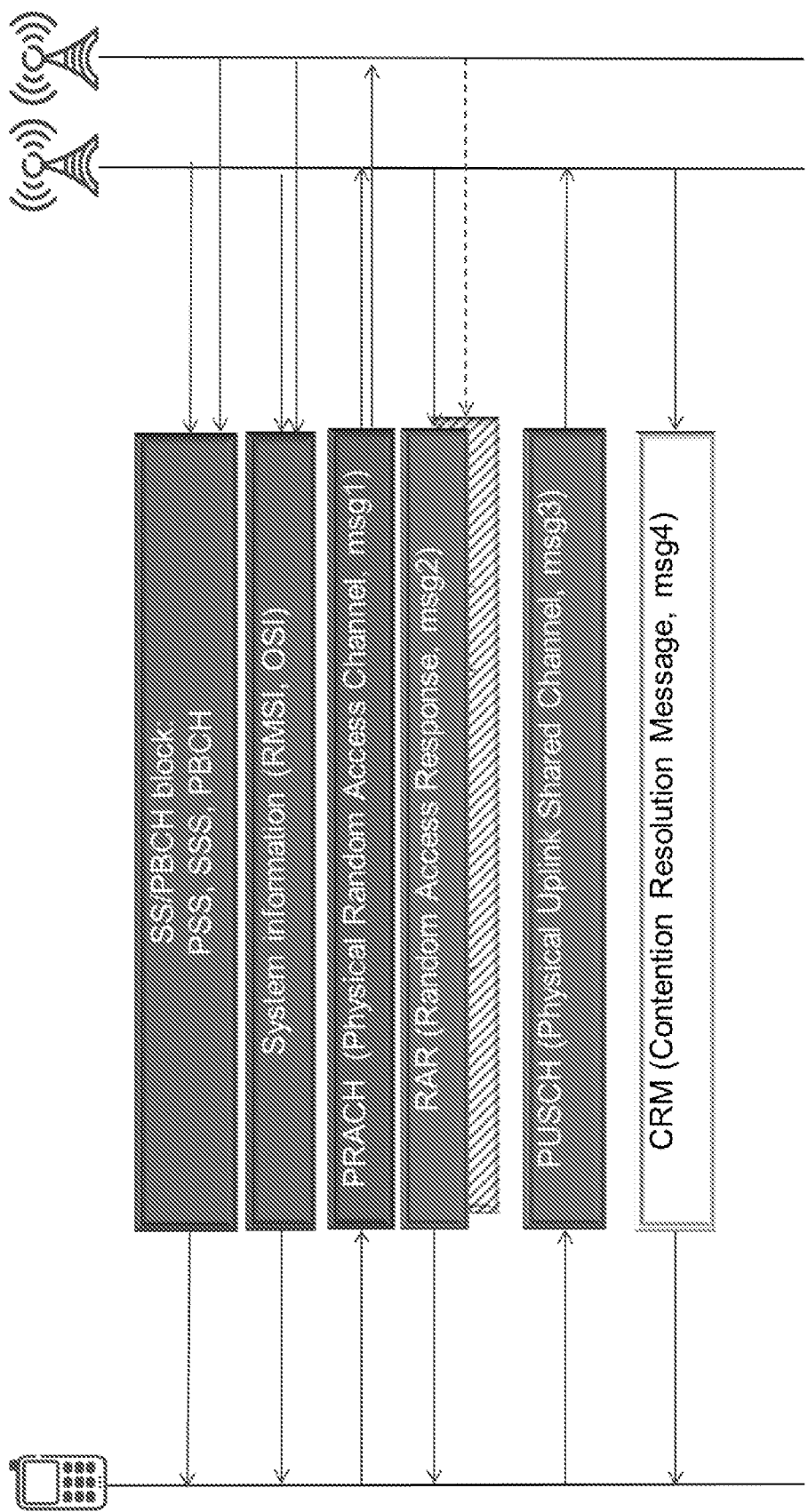
FIG. 1 is a diagram illustrating an exemplary four-step RA procedure according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. As described previously, in order to connect to a network node such as a gNB in a wireless communication network, a terminal device such as a UE may need to perform a RA procedure to exchange essential information and messages for communication link establishment with the network node.

FIG. 1 is a diagram illustrating an exemplary four-step RA procedure according to an embodiment of the present disclosure. As shown in FIG. 1, a UE can detect a synchronization signal (SS) by receiving, from a gNB in a NR system, an SSB (i.e. synchronization signal block, which is also referred to as "SS/PBCH block") e.g. including a primary synchronization signal (PSS), a secondary synchronization signal (SSS), and physical broadcast channel (PBCH), etc. The UE can decode some system information (e.g., remaining minimum system information (RMSI) and other system information (OSI)) broadcasted in the downlink (DL). Then the UE may transmit a PRACH preamble (message1/msg1) in the uplink (UL). The gNB may reply with a random access response (RAR, message2/msg2). In response to the RAR, the UE may transmit the UE's identification information (message3/msg3) on PUSCH. Then the gNB may send a contention resolution message (CRM, message4/msg4) to the UE.

In this exemplary procedure, the UE transmits message3/msg3 on PUSCH after receiving a timing advance command in the RAR, allowing message3/msg3 on PUSCH to be received with timing accuracy within a cyclic prefix (CP). Without this timing advance, a very large CP may be needed in order to be able to demodulate and detect message3/msg3 on PUSCH, unless the communication system is applied in a cell with very small distance between the UE and the gNB. Since the NR system can also support larger cells with a need for providing a timing advance command to the UE, the four-step approach is needed for the RA procedure.

Figure 2:
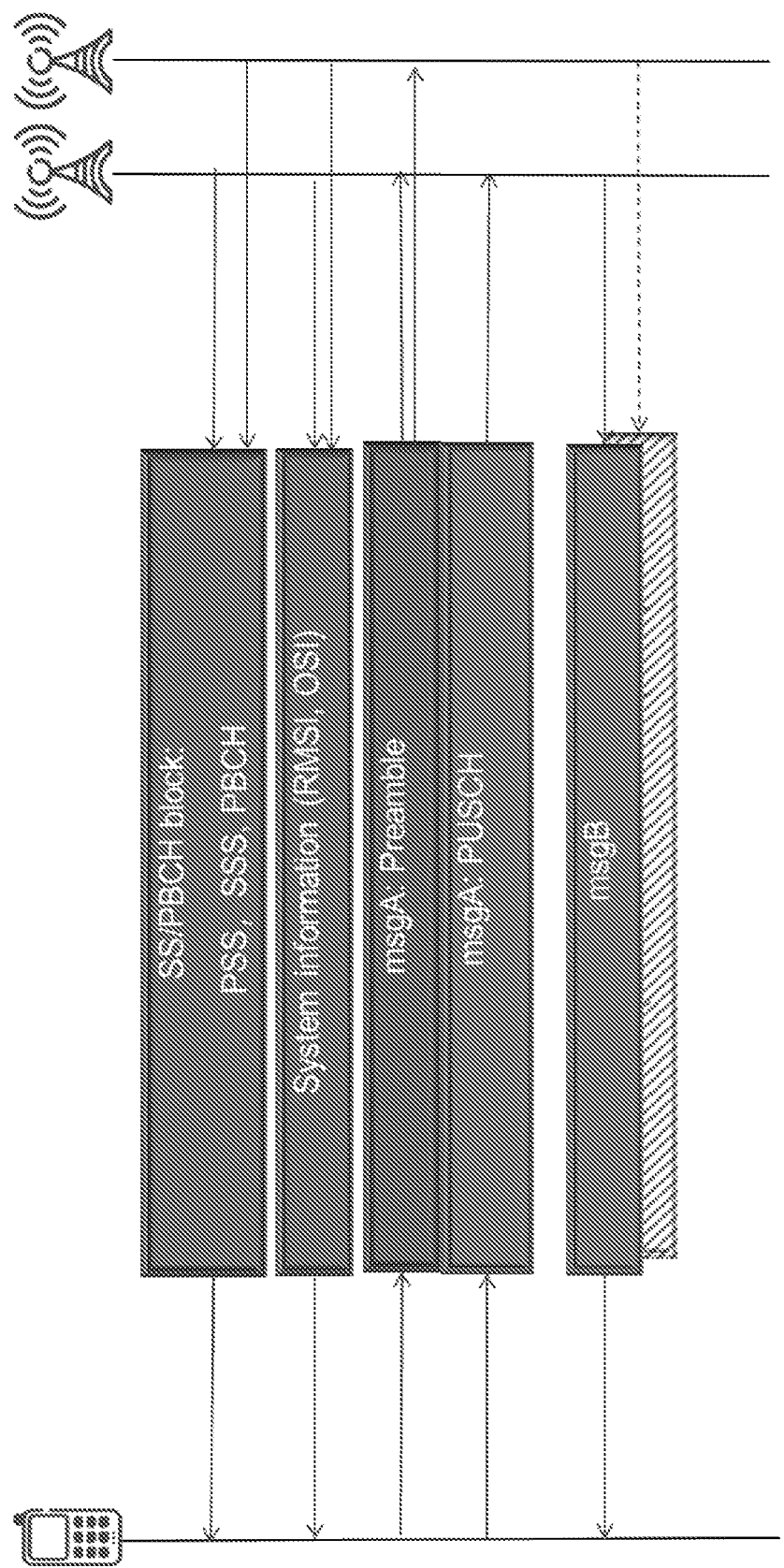
FIG. 2 is a diagram illustrating an exemplary two-step RA procedure according to an embodiment of the present disclosure.

FIG. 2 is a diagram illustrating an exemplary two-step RA procedure according to an embodiment of the present disclosure. Similar to the procedure as shown in FIG. 1, in the procedure shown in FIG. 2, a UE may detect a SS by receiving an SSB (e.g., including a PSS, an SSS and PBCH) from a gNB in a NR system, and decode system information (e.g., remaining minimum system information (RMSI) and other system information (OSI)) broadcasted in the DL. Compared to the four-step approach as shown in FIG. 1, the UE performing the procedure in FIG. 2 can complete initial access in only two steps. Firstly, the UE sends to the gNB a message A (abbreviated "MsgA" or "msgA", where these two abbreviations may be used interchangeably in this document) including RA preamble together with higher layer data such as a radio resource control (RRC) connection request possibly with some payload on PUSCH. Secondly, the gNB sends to the UE a RAR (also called message B or abbreviated "MsgB" or "msgB", where these two abbreviations may be used interchangeably in this document) including UE identifier assignment, timing advance information, a contention resolution message, and etc. It can be seen that there may be no explicit grant from msgB for PUSCH in msgA as the msgB is after msgA.

For transmission of an MsgA PUSCH, i.e. the PUSCH part of an MsgA, the notion of a PUSCH resource unit is introduced, where a PUSCH resource unit may consist of time-frequency radio resources of transmission and DMRS sequence configuration. Two simultaneous MsgA PUSCH transmissions can be distinguished by the receiver if different PUSCH resource units are used for the two transmissions. The notion of PUSCH occasion is also introduced, where a PUSCH occasion may consist of time-frequency radio resources for the transmission of an MsgA PUSCH.

In accordance with some exemplary embodiments, a RA procedure such as two-step RACH and four-step RACH can be performed in two different ways, e.g., contention-based (CBRA) and contention-free (CFRA). The difference lies in which preamble is used. In the contention-based case, a UE may randomly select a preamble from a range of preambles. For this case, there may be a collision if two UEs select the same preamble. In the contention-free case, a UE may be given a specific preamble by the network, which ensures that two UEs will not select the same preamble, thus the RA is collision-free. The CBRA may be typically used when a UE is in an idle/inactive state and wants to go to the connected state, while the CFRA may be used for performing handover and/or in beam failure procedures.

For a PUSCH transmission in NR, TDRA of a MsgA PUSCH (also referred to as "TDRA for MsgA PUSCH transmission" in this document) may be based on either TDRA tables or explicit start and length indicator value (SLIV) signaling. For example, as described in 3GPP TS 38.213 V16.2.0, the TDRA for the MsgA PUSCH may be provided as below:
If a UE does not have dedicated RRC configuration, or has an initial UL BWP as an active UL BWP, or is not provided startSymbolAndLengthMsgA-PO, msgA-PUSCH-timeDomainAllocation provides a SLIV and a PUSCH mapping type for a PUSCH transmission by indicating:
first maxNrofUL-Allocations values from PUSCH-TimeDomainResourceAllocationList, if PUSCH-TimeDomainResourceAllocationList is provided in PUSCH-ConfigCommon;
entries from table 6.1.2.1.1-2 in 3GPP TS 38.214 V16.2.0 (where the entire content of this technical specification is incorporated into the present disclosure by reference), if PUSCH-TimeDomainResourceAllocationList is not provided in PUSCH-ConfigCommon;
else, the UE is provided a SLIV by startSymbolAndLengthMsgA-PO, and a PUSCH mapping type by mappingTypeMsgA-PUSCH for a PUSCH transmission.

The TDRA table may be provided in PUSCH-ConfigCommon from higher layer, or may be a default table. The default table currently used may be the one for normal CP, i.e. table 6.1.2.1.1-2 in 3GPP TS 38.214 V16.2.0. The CP length for a BWP of a UE may be configured via the parameter cyclicPrefix in a BWP IE.

FIG. 3 is a diagram illustrating an exemplary BWP IE according to an embodiment of the present disclosure. A parameter such as cyclicPrefix may be included in the BWP IE to indicate whether to use the extended CP for this BWP. If the parameter cyclicPrefix is not set, the UE may use the normal CP for this BWP. The normal CP may be supported for all subcarrier spacings and slot formats. The extended CP may be supported only for 60 kHz subcarrier spacing, e.g., as described in clause 4.2 of 3GPP TS 38.211 V16.2.0, where the entire content of this technical specification is incorporated into the present disclosure by reference.

In a two-step RA procedure, only the default TDRA table for normal CP is used for MsgA PUSCH transmission. But if both normal CP and extended CP may be supported for MsgA PUSCH transmission, it may be needed to apply a TDRA table (e.g., a default table, etc.) for the extended CP.

Various exemplary embodiments of the present disclosure propose a solution for RA, which can determine CP and corresponding TDRA for a MsgA PUSCH in a two-step RA procedure. In an embodiment, different connection states (e.g., idle/inactive/connected mode, etc.) and/or RA types (e.g., CBRA, CFRA, etc.) of a UE may be considered when signaling the application of normal CP and/or extended CP for MsgA PUSCH transmission. According to various embodiments, the default TDRA table applicable for a MsgA PUSCH may be determined based on whether the normal CP and/or the extended CP may be supported for the MsgA PUSCH.

In accordance with an exemplary embodiment, both the extended CP and the normal CP can be supported for MsgA PUSCH transmission. In this case, the default TDRA tables for the extended CP and the normal CP respectively may be applied to the MsgA PUSCH transmission. According to an embodiment, when a parameter such as cyclicPrefix indicates that the extended CP is configured for the active BWP where a MsgA PUSCH is transmitted, table 6.1.2.1.1-3 in 3GPP TS 38.214 V16.2.0 may be used as the default TDRA table for the MsgA PUSCH transmission in two-step RA. Alternatively or additionally, if the normal CP is configured for the active BWP where the MsgA PUSCH is transmitted, then table 6.1.2.1.1-2 in 3GPP TS 38.214 V16.2.0 may be used as the default TDRA table for the MsgA PUSCH transmission in two-step RA.

According to an exemplary embodiment, the default TDRA table for MsgA PUSCH transmission may be provided as below:

If a UE does not have dedicated RRC configuration, or has an initial UL BWP as an active UL BWP, or is not provided startSymbolAndLengthMsgA-PO, msgA-PUSCH-timeDomainAllocation provides a SLIV and a PUSCH mapping type for a PUSCH transmission by indicating:

first maxNrofUL-Allocations values from PUSCH-TimeDomainResourceAllocationList, if PUSCH-TimeDomainResourceAllocationList is provided in PUSCH-ConfigCommon;

entries from table 6.1.2.1.1-2 for normal CP or table 6.1.2.1.1-3 for extended CP in 3GPP TS 38.214 V16.2.0, if PUSCH-TimeDomainResourceAllocationList is not provided in PUSCH-ConfigCommon;

else, the UE is provided a SLIV by startSymbolAndLengthMsgA-PO, and a PUSCH mapping type by mappingTypeMsgA-PUSCH for a PUSCH transmission.

In accordance with an exemplary embodiment, only the normal CP can be supported for MsgA PUSCH transmission. In this case, the default TDRA table used for MsgA PUSCH transmission may be the default TDRA table for the normal CP.

According to an exemplary embodiment, the default TDRA table for MsgA PUSCH transmission for which only the normal CP is supported may be provided as below:

If a UE does not have dedicated RRC configuration, or has an initial UL BWP as an active UL BWP, or is not provided startSymbolAndLengthMsgA-PO, msgA-PUSCH-timeDomainAllocation provides a SLIV and a PUSCH mapping type for a PUSCH transmission by indicating:

first maxNrofUL-Allocations values from PUSCH-TimeDomainResourceAllocationList, if PUSCH-TimeDomainResourceAllocationList is provided in PUSCH-ConfigCommon;

entries from table 6.1.2.1.1-2 in 3GPP TS 38.214 V16.2.0, if PUSCH-TimeDomainResourceAllocationList is not provided in PUSCH-ConfigCommon;

else, the UE is provided a SLIV by startSymbolAndLengthMsgA-PO, and a PUSCH mapping type by mappingTypeMsgA-PUSCH for a PUSCH transmission;

The UE assumes that only the normal CP is used for MsgA PUSCH transmission.

In accordance with an exemplary embodiment, whether the extended CP or the normal CP is applied to MsgA PUSCH transmission may be separately signaled in RRC signaling. As an example, if the extended CP is indicated by the RRC signaling, a default TDRA table for the extended CP may be used for the MsgA PUSCH transmission. Alternatively or additionally, if the normal CP is indicated by the RRC signaling, the default TDRA table for the normal CP may be used for the MsgA PUSCH transmission.

According to an embodiment, for UEs in RRC idle/inactive mode or in CBRA of two-step RA type, a parameter such as cyclicPrefix2step of the CP for MsgA PUSCH transmission may be signaled in common RRC signaling, e.g. in MsgA-ConfigCommon IE. According to another embodiment, for UEs in RRC connected mode or in CFRA of two-step RA type, a parameter such as cyclicPrefix2step of the CP for MsgA PUSCH transmission may be signaled in dedicated RRC signaling, e.g. in MsgA-CFRA-PUSCH IE in CFRA-TwoStep-r16.

For example, the parameter cyclicPrefix2step for the MsgA PUSCH transmission may be defined as below:
    cyclicPrefix2step ENUMERATED {extended} where the parameter cyclicPrefix2step indicates whether to use the extended CP for MsgA PUSCH transmission. In an embodiment, if the parameter cyclicPrefix2step is not set, the UE may use the normal CP for the MsgA PUSCH transmission. As an example, the normal CP may be supported for all subcarrier spacings and slot formats, and the extended CP may be supported only for 60 kHz subcarrier spacing, as described in clause 4.2 of 3GPP TS 38.211 V16.2.0.

It can be realized that the names of parameters/messages and some settings related to the signaling transmission and resource configuration described herein are just examples. Other suitable names and associated settings of the parameters/messages may also be applicable to implement various embodiments.

It is noted that some embodiments of the present disclosure are mainly described in relation to 4G/LTE or 5G/NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

FIG. 4A is a flowchart illustrating a method 410 according to some embodiments of the present disclosure. The method 410 illustrated in FIG. 4A may be performed by a terminal device or an apparatus communicatively coupled to the terminal device. In accordance with an exemplary embodiment, the terminal device such as a UE may be configured to connect to a network node such as a gNB, for example, by performing a RA procedure (e.g., a two-step CBRA or CFRA procedure).

According to the exemplary method 410 illustrated in FIG. 4A, the terminal device may receive, from a network node, signaling information indicating whether a first type of CP or a second type of CP is configured for transmission of an uplink shared channel of a message (e.g., MsgA PUSCH, etc.) of the terminal device, as shown in block 412. The message (e.g. message A, etc.) may include data on the uplink shared channel (e.g., payload or information on PUSCH, etc.) and a random access preamble (e.g., PRACH preamble, etc.). In accordance with an exemplary embodiment, the terminal device may determine TDRA (e.g., a TDRA table, etc.) for the transmission of the uplink shared channel of the message, based at least in part on the signaling information, as shown in block 414.

In accordance with an exemplary embodiment, the first type of CP may be a normal CP and the second type of CP may be an extended CP. It can be appreciated that various embodiments according to the present disclosure may also be applicable to other suitable types of CP and determination of the corresponding TDRA for the transmission of the uplink shared channel of the message.

In accordance with an exemplary embodiment, both the first type of CP and the second type of CP may be supported for the transmission of the uplink shared channel of the message. According to an embodiment, the TDRA for the transmission of the uplink shared channel of the message may be default TDRA for the first type of CP, when the signaling information (e.g., the parameter/field such as cyclicPrefix, etc.) indicates that the first type of CP is configured for an active BWP for the transmission of the uplink shared channel of the message. Alternatively or additionally, the TDRA for the transmission of the uplink shared channel of the message may be default TDRA for the second type of CP, when the signaling information (e.g., the parameter/field such as cyclicPrefix, etc.) indicates that the second type of CP is configured for an active BWP for the transmission of the uplink shared channel of the message. In an embodiment, the signaling information (e.g., the parameter/field such as cyclicPrefix, etc.) may be included in a BWP IE.

In accordance with an exemplary embodiment, the TDRA for the transmission of the uplink shared channel of the message may be default TDRA for the first type of CP, when only the first type of CP is supported for the transmission of the uplink shared channel of the message.

In accordance with an exemplary embodiment, the TDRA for the transmission of the uplink shared channel of the message may be default TDRA for the first type of CP, when the signaling information (e.g., the parameter/field such as cyclicPrefix2step, etc.) indicates that the first type of CP is configured for the transmission of the uplink shared channel of the message. Alternatively or additionally, the TDRA for the transmission of the uplink shared channel of the message may be default TDRA for the second type of CP, when the signaling information (e.g., the parameter/field such as cyclicPrefix2step, etc.) indicates that the second type of CP is configured for the transmission of the uplink shared channel of the message. In an embodiment, the signaling information (e.g., the parameter/field such as cyclicPrefix2step, etc.) may be included in RRC signaling.

In accordance with an exemplary embodiment, the terminal device may be in RRC idle or inactive mode, or in a two-step CBRA procedure. In this case, the RRC signaling including the signaling information may be common RRC signaling. In another embodiment, the terminal device may be in RRC connected mode, or in a two-step CFRA procedure. Correspondingly, the RRC signaling including the signaling information in this case may be dedicated RRC signaling.

Figure 4B:
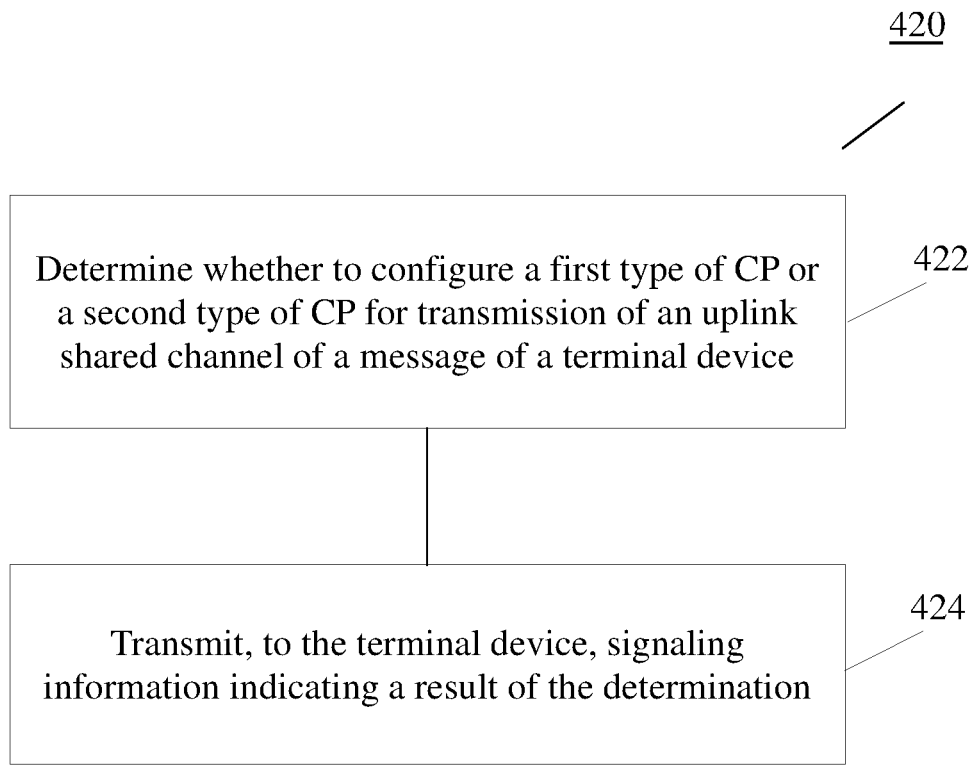
FIG. 4B is a flowchart illustrating another method according to some embodiments of the present disclosure.

FIG. 4B is a flowchart illustrating a method 420 according to some embodiments of the present disclosure. The method 420 illustrated in FIG. 4B may be performed by a network node or an apparatus communicatively coupled to the network node. In accordance with an exemplary embodiment, the network node may comprise a base station such as a gNB. The network node may be configured to communicate with one or more terminal devices such as UEs which can connect to the network node by performing a RA procedure (e.g., a two-step CBRA or CFRA procedure).

According to the exemplary method 420 illustrated in FIG. 4B, the network node may determine whether to configure a first type of CP or a second type of CP for transmission of an uplink shared channel of a message (e.g., MsgA PUSCH, etc.) of a terminal device (e.g., the terminal device as described with respect to FIG. 4A), as shown in block 422. The message (e.g. message A, etc.) may include data on the uplink shared channel and a random access preamble. In accordance with an exemplary embodiment, the network node may transmit, to the terminal device, signaling information indicating a result of the determination, as shown in block 424. The signaling information may be used by the terminal device to determine TDRA for the transmission of the uplink shared channel of the message.

It can be appreciated that the steps, operations and related configurations of the method 420 illustrated in FIG. 4B may correspond to the steps, operations and related configurations of the method 410 illustrated in FIG. 4A. It also can be appreciated that the signaling information transmitted by the network node according to the method 420 may correspond to the signaling information received by the terminal device according to the method 410. Thus, the signaling information as described with respect to FIG. 4A and FIG. 4B may have the same or similar contents and/or feature elements. Correspondingly, the determination of TDRA for the transmission of the uplink shared channel of the message as described with respect to FIG. 4A and FIG. 4B may be based on the same or similar parameter(s) and/or criterion(s).

The various blocks shown in FIGS. 4A-4B may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 5:
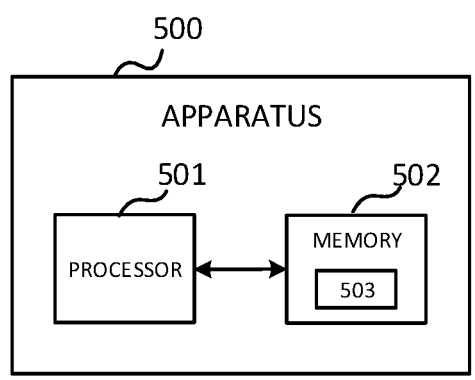
FIG. 5 is a block diagram illustrating an apparatus according to some embodiments of the present disclosure.

FIG. 5 is a block diagram illustrating an apparatus 500 according to various embodiments of the present disclosure. As shown in FIG. 5, the apparatus 500 may comprise one or more processors such as processor 501 and one or more memories such as memory 502 storing computer program codes 503. The memory 502 may be non-transitory machine/processor/computer readable storage medium. In accordance with some exemplary embodiments, the apparatus 500 may be implemented as an integrated circuit chip or module that can be plugged or installed into a terminal device as described with respect to FIG. 4A, or a network node as described with respect to FIG. 4B. In such case, the apparatus 500 may be implemented as a terminal device as described with respect to FIG. 4A, or a network node as described with respect to FIG. 4B.

In some implementations, the one or more memories 502 and the computer program codes 503 may be configured to, with the one or more processors 501, cause the apparatus 500 at least to perform any operation of the method as described in connection with FIG. 4A. In other implementations, the one or more memories 502 and the computer program codes 503 may be configured to, with the one or more processors 501, cause the apparatus 500 at least to perform any operation of the method as described in connection with FIG. 4B. Alternatively or additionally, the one or more memories 502 and the computer program codes 503 may be configured to, with the one or more processors 501, cause the apparatus 500 at least to perform more or less operations to implement the proposed methods according to the exemplary embodiments of the present disclosure.

Figure 6A:
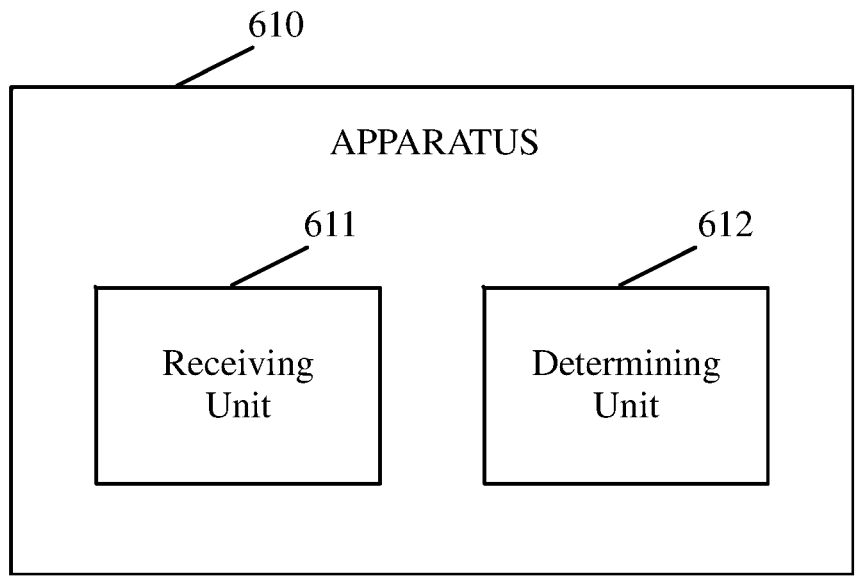
FIG. 6A is a block diagram illustrating another apparatus according to some embodiments of the present disclosure.

FIG. 6A is a block diagram illustrating an apparatus 610 according to some embodiments of the present disclosure. As shown in FIG. 6A, the apparatus 610 may comprise a receiving unit 611 and a determining unit 612. In an exemplary embodiment, the apparatus 610 may be implemented in a terminal device such as a UE. The receiving unit 611 may be operable to carry out the operation in block 412, and the determining unit 612 may be operable to carry out the operation in block 414. Optionally, the receiving unit 611 and/or the determining unit 612 may be operable to carry out more or less operations to implement the proposed methods according to the exemplary embodiments of the present disclosure.

Figure 6B:
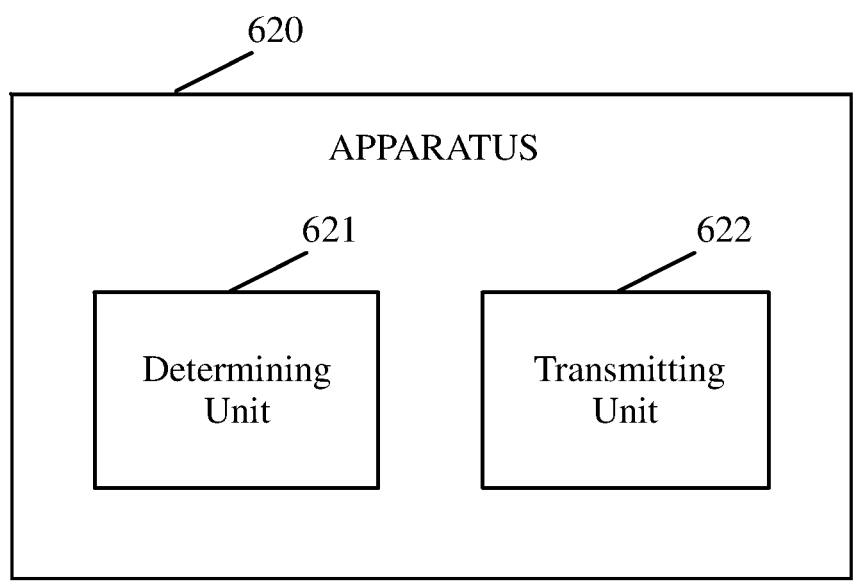
FIG. 6B is a block diagram illustrating a further apparatus according to some embodiments of the present disclosure.

FIG. 6B is a block diagram illustrating an apparatus 620 according to some embodiments of the present disclosure. As shown in FIG. 6B, the apparatus 620 may comprise a determining unit 621 and a transmitting unit 622. In an exemplary embodiment, the apparatus 620 may be implemented in a network node such as a base station. The determining unit 621 may be operable to carry out the operation in block 422, and the transmitting unit 622 may be operable to carry out the operation in block 424. Optionally, the determining unit 621 and/or the transmitting unit 622 may be operable to carry out more or less operations to implement the proposed methods according to the exemplary embodiments of the present disclosure.

Figure 7:
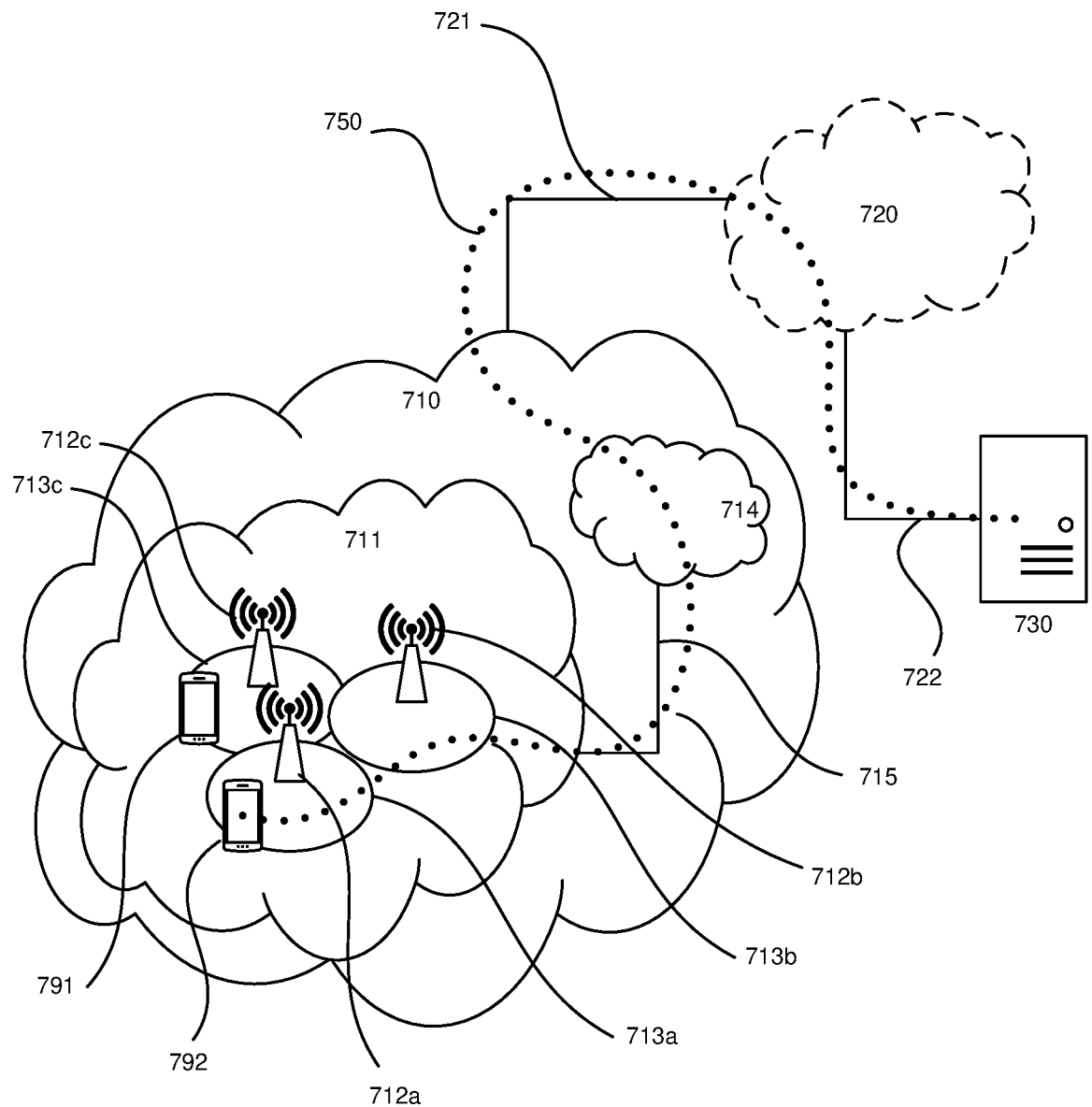
FIG. 7 is a block diagram illustrating a telecommunication network connected via an intermediate network to a host computer in accordance with some embodiments of the present disclosure.

FIG. 7 is a block diagram illustrating a telecommunication network connected via an intermediate network to a host computer in accordance with some embodiments of the present disclosure.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first UE 791 located in a coverage area 713c is configured to wirelessly connect to, or be paged by, the corresponding base station 712c. A second UE 792 in a coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. Connections 721 and 722 between the telecommunication network 710 and the host computer 730 may extend directly from the core network 714 to the host computer 730 or may go via an optional intermediate network 720. An intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, the base station 712 may not or need not be informed about the past routing of an incoming downlink communication with data originating from the host computer 730 to be forwarded (e.g., handed over) to a connected UE 791. Similarly, the base station 712 need not be aware of the future routing of an outgoing uplink communication originating from the UE 791 towards the host computer 730.

Figure 8:
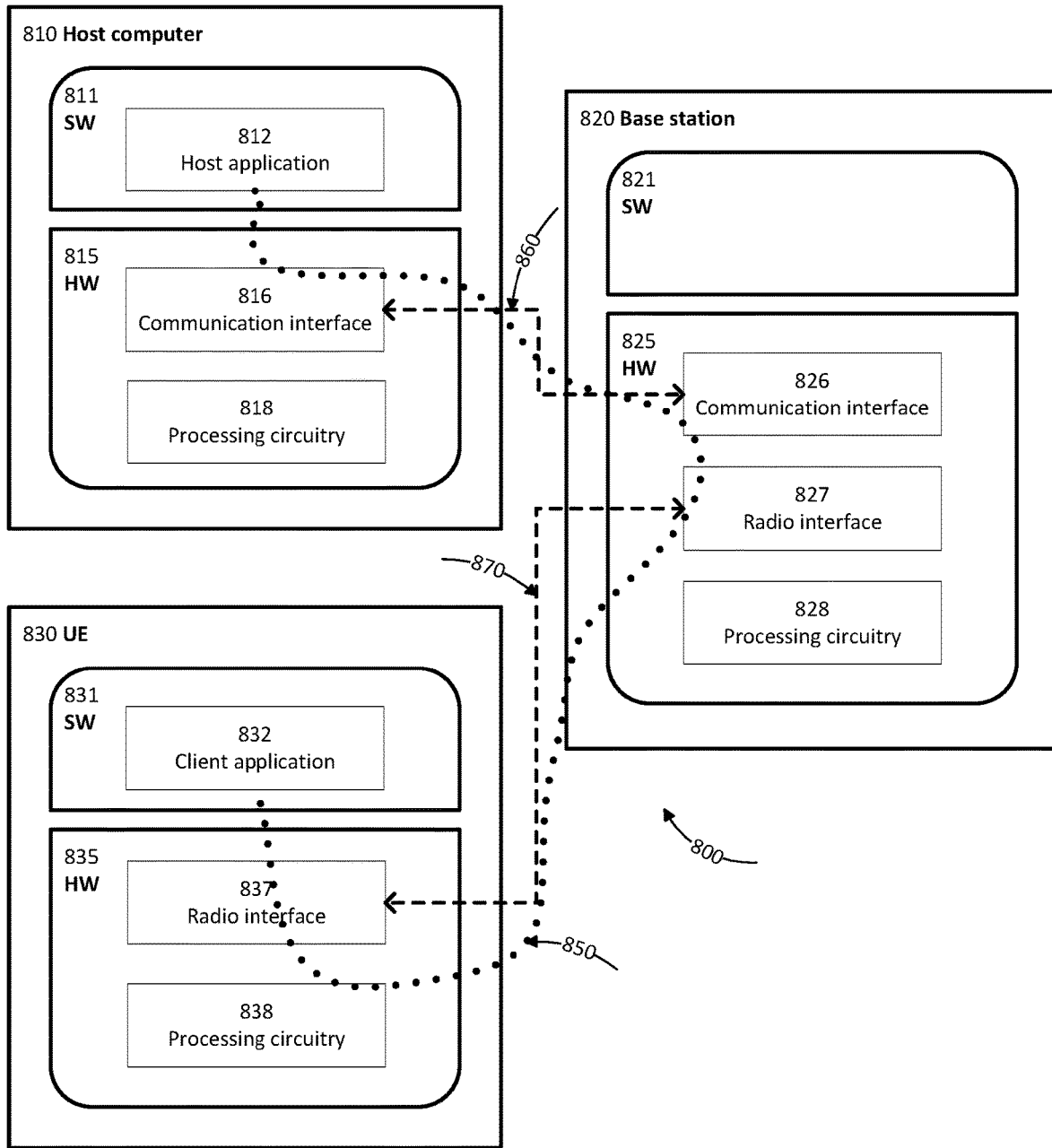
FIG. 8 is a block diagram illustrating a host computer communicating via a base station with a UE over a partially wireless connection in accordance with some embodiments of the present disclosure.

FIG. 8 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises a processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes a processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes a processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

It is noted that the host computer 810, the base station 820 and the UE 830 illustrated in FIG. 8 may be similar or identical to the host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the UE 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

Wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 850 between the host computer 810 and the UE 830, in response to variations in the measurement results. The measurement procedure and/or the network functionality for reconfiguring the OTT connection 850 may be implemented in software 811 and hardware 815 of the host computer 810 or in software 831 and hardware 835 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which the software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer 810's measurements of throughput, propagation times, latency and the like. The measurements may be implemented in that the software 811 and 831 causes messages to be transmitted, in particular empty or 'dummy' messages, using the OTT connection 850 while it monitors propagation times, errors etc.

Figure 9:
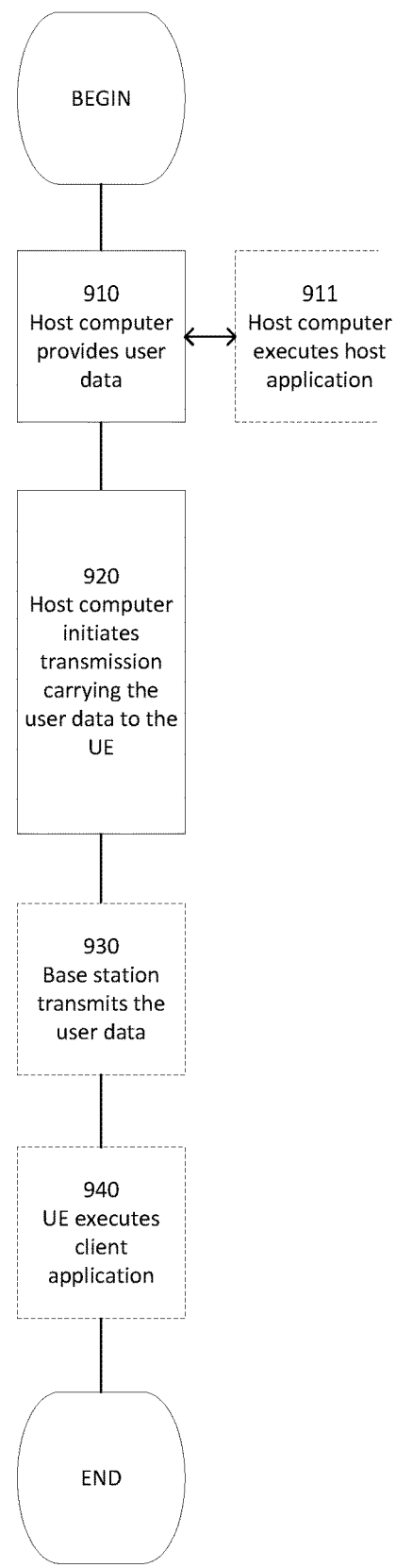
FIG. 9 is a flowchart illustrating a method implemented in a communication system, in accordance with an embodiment of the present disclosure.

FIG. 9 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
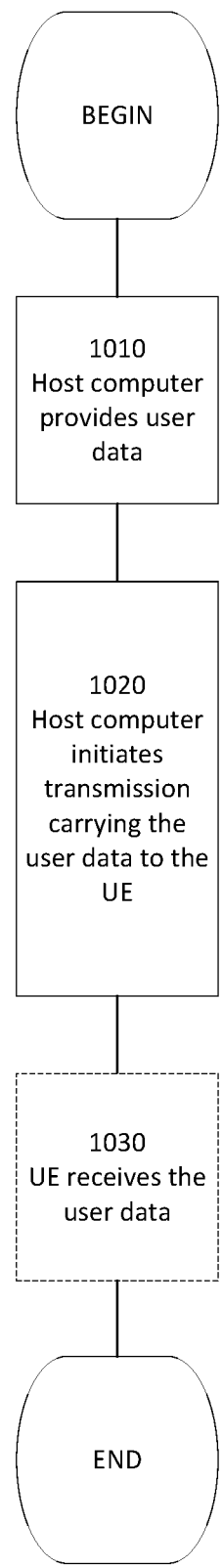
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
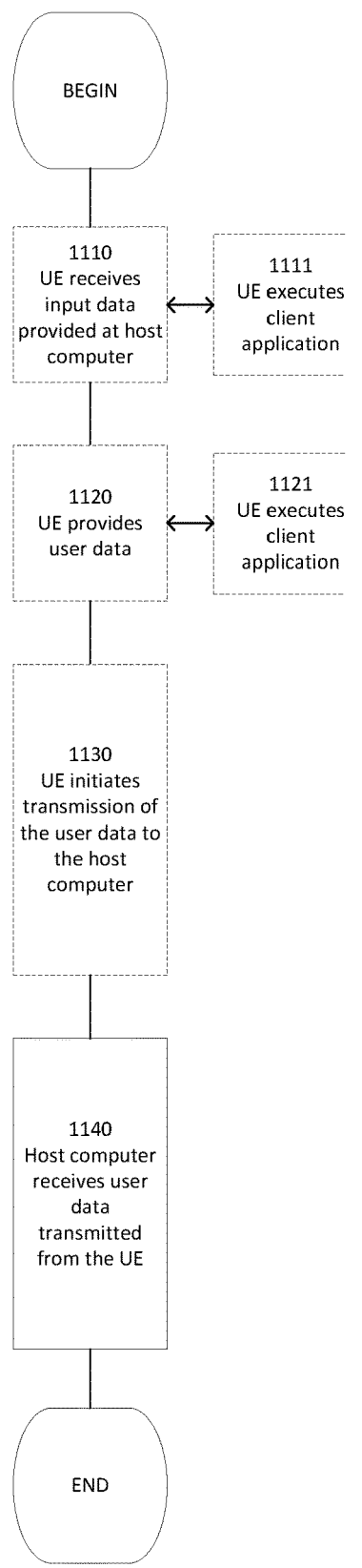
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
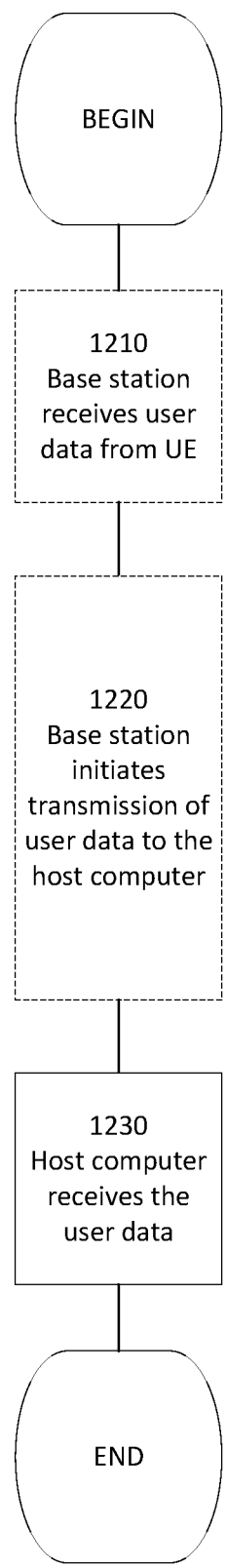
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the exemplary method 420 as describe with respect to FIG. 4B.

According to some exemplary embodiments, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the exemplary method 420 as describe with respect to FIG. 4B.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the exemplary method 410 as describe with respect to FIG. 4A.

According to some exemplary embodiments, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the exemplary method 410 as describe with respect to FIG. 4A.

According to some exemplary embodiments, there is provided a method implemented in a communication system which may include a host computer, a base station and a UE. The method may comprise, at the host computer, receiving user data transmitted to the base station from the UE which may perform any step of the exemplary method 410 as describe with respect to FIG. 4A.

According to some exemplary embodiments, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the exemplary method 410 as describe with respect to FIG. 4A.

According to some exemplary embodiments, there is provided a method implemented in a communication system which may include a host computer, a base station and a UE. The method may comprise, at the host computer, receiving, from the base station, user data originating from a transmission which the base station has received from the UE. The base station may perform any step of the exemplary method 420 as describe with respect to FIG. 4B.

According to some exemplary embodiments, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the exemplary method 420 as describe with respect to FIG. 4B.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device, the method comprising:
receiving, from a network node, signaling information indicating whether a normal type of cyclic prefix or a extended type of cyclic prefix is configured for transmission of a message by the terminal device on an uplink shared channel together with a random access preamble on a random access channel, in a two-step random access procedure;
determining time domain resource allocation for the transmission of the message on the uplink shared channel, based at least in part on the signaling information, wherein when both the normal and extended types of cyclic prefix are supported on the uplink shared channel and the signaling information indicates that the extended type of cyclic prefix is configured for an active bandwidth part of the terminal device on the uplink shared channel, the time domain resource allocation is determined to be a default time domain resource allocation associated with the extended type of cyclic prefix; and
transmitting the message on the uplink shared channel together with the random access preamble on the random access channel, wherein the message is transmitted with the indicated type of cyclic prefix and in the determined time domain resource allocation.

2. The method of claim 1, wherein the time domain resource allocation for the transmission of the message on the uplink shared channel is determined to be a default time domain resource allocation for the normal type of cyclic prefix, when both the normal and extended types of cyclic prefix are supported on the uplink shared channel and the signaling information indicates that the normal type of cyclic prefix is configured for an active bandwidth part for the transmission of the message on the uplink shared channel.

3. The method of claim 1, wherein the time domain resource allocation for the transmission of the message on the uplink shared channel is determined to be a default time domain resource allocation for the normal type of cyclic prefix, when only the normal type of cyclic prefix is supported for the transmission of the message on the uplink shared channel.

4. The method of claim 1, wherein the signaling information is included in a bandwidth part information element.

5. The method of claim 1, wherein the time domain resource allocation for the transmission of the message on the uplink shared channel is determined to be a default time domain resource allocation for the normal type of cyclic prefix, when only the normal type of cyclic prefix is supported on the uplink shared channel and the signaling information indicates that the normal type of cyclic prefix is configured for the transmission of the message on the uplink shared channel.

6. The method of claim 1, wherein the time domain resource allocation for the transmission of the message on the uplink shared channel is determined to be a default time domain resource allocation for the extended type of cyclic prefix, when only the extended type of cyclic prefix is supported on the uplink shared channel and the signaling information indicates that the extended type of cyclic prefix is configured for the transmission of the message on the uplink shared channel.

7. The method of claim 1, wherein the signaling information is included in radio resource control (RRC) signaling and one of the following applies:
the RRC signaling is common RRC signaling, and the terminal device is in one of the following: RRC idle mode, RRC inactive mode, or a two-step contention-based random access procedure; or
the RRC signaling is dedicated RRC signaling, and the terminal device is in RRC connected mode or in a two-step contention-free random access procedure.

8. A terminal device comprising:
one or more processors; and
one or more memories comprising computer program code executable by the one or more processors, wherein execution of the computer program code by the one or more processors configures the terminal device to:
receive, from a network node, signaling information indicating whether a normal type of cyclic prefix or a extended type of cyclic prefix is configured for transmission of a message by the terminal device on an uplink shared channel together with a random access preamble on a random access channel, in a two-step random access procedure;
determine time domain resource allocation for the transmission of the message on the uplink shared channel, based at least in part on the signaling information, wherein when both the normal and extended types of cyclic prefix are supported on the uplink shared channel and the signaling information indicates that the extended type of cyclic prefix is configured for an active bandwidth part of the terminal device on the uplink shared channel, the time domain resource allocation is determined to be a default time domain resource allocation associated with the extended type of cyclic prefix; and
transmit the message on the uplink shared channel together with the random access preamble on the random access channel, wherein the message is transmitted with the indicated type of cyclic prefix and in the determined time domain resource allocation.

9. The terminal device of claim 8, wherein the time domain resource allocation for the transmission of the message on the uplink shared channel is determined to be a default time domain resource allocation for the normal type of cyclic prefix, when both the normal and extended types of cyclic prefix are supported on the uplink shared channel and the signaling information indicates that the normal type of cyclic prefix is configured for an active bandwidth part for the transmission of the message on the uplink shared channel.

10. The terminal device of claim 8, wherein the time domain resource allocation for the transmission of the message on the uplink shared channel is determined to be a default time domain resource allocation for the normal type of cyclic prefix, when only the normal type of cyclic prefix is supported for the transmission of the message on the uplink shared channel.

11. The terminal device of claim 8, wherein the time domain resource allocation for the transmission of the message on the uplink shared channel is determined to be a default time domain resource allocation for the normal type of cyclic prefix, when only the normal type of cyclic prefix is supported on the uplink shared channel and the signaling information indicates that the normal type of cyclic prefix is configured for the transmission of the message on the uplink shared channel.

12. The terminal device of claim 8, wherein the time domain resource allocation for the transmission of the message on the uplink shared channel is determined to be a default time domain resource allocation for the extended type of cyclic prefix, when only the extended type of cyclic prefix is supported on the uplink shared channel and the signaling information indicates that the extended type of cyclic prefix is configured for the transmission of the message on the uplink shared channel.

13. A method performed by a network node, the method comprising:
    transmitting, to the terminal device, signaling information indicating whether a normal type of cyclic prefix or an extended type of cyclic prefix is configured for transmission by the terminal device of a message on an uplink shared channel together with a random access preamble on a random access channel, in a two-step random access procedure; and
    receiving, from the terminal device, the random access preamble on the random access channel together with the message on the uplink shared channel, wherein:
        the message has the indicated type of cyclic prefix,
        the message is received in a time domain resource allocation associated with the indicated type of cyclic prefix, and
        when both the normal and extended types of cyclic prefix are supported on the uplink shared channel and the signaling information indicates that the extended type of cyclic prefix is configured for an active bandwidth part of the terminal device on the uplink shared channel, the message is received in a default time domain resource allocation associated with the extended type of cyclic prefix.

14. The method of claim 13, wherein the time domain resource allocation for the transmission of the message on the uplink shared channel is a default time domain resource allocation for the normal type of cyclic prefix, when both the normal and extended types of cyclic prefix are supported on the uplink shared channel and the signaling information indicates that the normal type of cyclic prefix is configured for an active bandwidth part for the transmission of the message on the uplink shared channel.

15. The method of claim 13, wherein the signaling information is included in a bandwidth part information element.

16. The method of claim 13, wherein the time domain resource allocation for the transmission of the message on the uplink shared channel is a default time domain resource allocation for the normal type of cyclic prefix, when only the normal type of cyclic prefix is supported on the uplink shared channel and the signaling information indicates that the normal type of cyclic prefix is configured for the transmission of the message on the uplink shared channel.

17. The method of claim 13, wherein the time domain resource allocation for the transmission of the message on the uplink shared channel is a default time domain resource allocation for the extended type of cyclic prefix, when only the extended type of cyclic prefix is supported on the uplink shared channel and the signaling information indicates that the extended type of cyclic prefix is configured for the transmission of the message on the uplink shared channel.

18. The method of claim 13, wherein the signaling information is included in radio resource control (RRC) signaling and one of the following applies:
    the RRC signaling is common RRC signaling, and the terminal device is in one of the following: RRC idle mode, RRC inactive mode, or a two-step contention-based random access procedure; or
    the RRC signaling is dedicated RRC signaling, and the terminal device is in RRC connected mode or in a two-step contention-free random access procedure.

* * * * *